United States Patent [19]
Bird

[11] 3,951,396
[45] Apr. 20, 1976

[54] WIRING SYSTEM RETAINER

[75] Inventor: Joseph W. Bird, Scituate, Mass.

[73] Assignee: Ralph Pill Electric Supply Co., South Boston, Mass.

[22] Filed: Nov. 1, 1974

[21] Appl. No.: 519,986

[52] U.S. Cl. ............... 269/321 WE; 33/DIG. 10; 174/48; 339/22 R
[51] Int. Cl.² ........................................ H01R 33/00
[58] Field of Search......... 33/DIG. 10; 174/48, 49; 339/22 R, 23, 24; 269/321 WE

[56] References Cited
UNITED STATES PATENTS

| | | | |
|---|---|---|---|
| 1,606,870 | 11/1926 | Corwin | 174/48 |
| 2,023,004 | 12/1935 | Clayton | 339/22 R |
| 2,480,805 | 8/1949 | Buckels | 174/48 |
| 2,495,280 | 1/1950 | O'Brien | 339/23 |
| 3,336,560 | 8/1967 | Myers | 339/22 R |

Primary Examiner—Roy Lake
Assistant Examiner—Mark S. Bicks
Attorney, Agent, or Firm—Wolf, Greenfield & Sacks

[57] ABSTRACT

A retainer, preferably constructed of cardboard, is provided for a length of a multi-wire cable having means for receiving and positioning an electrical outlet connected to one end of the cable. The retainer is for positioning and permitting the securing of the electrical outlet to the framework of a building. The retainer is preferably elongated in shape having a number of useable receiving cutouts for receiving outlets at different positions therealong, and can be used as a shipping carton for the length of cable and associated electrical outlet.

5 Claims, 3 Drawing Figures

U.S. Patent   April 20, 1976   Sheet 1 of 2   3,951,396
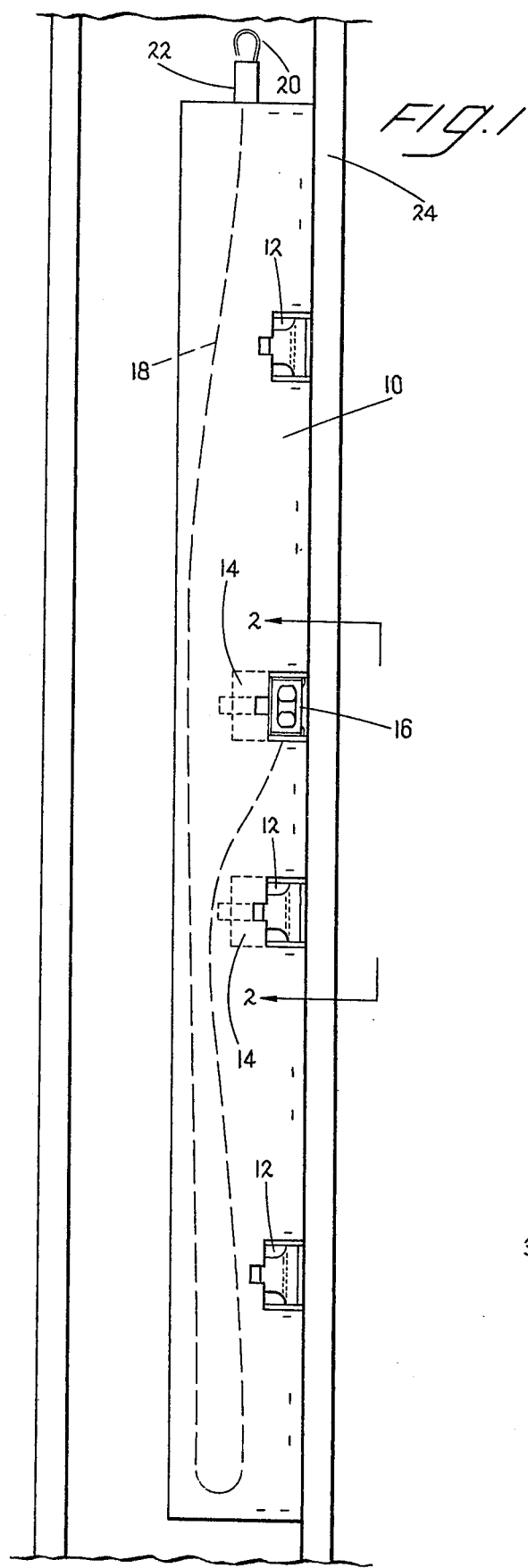
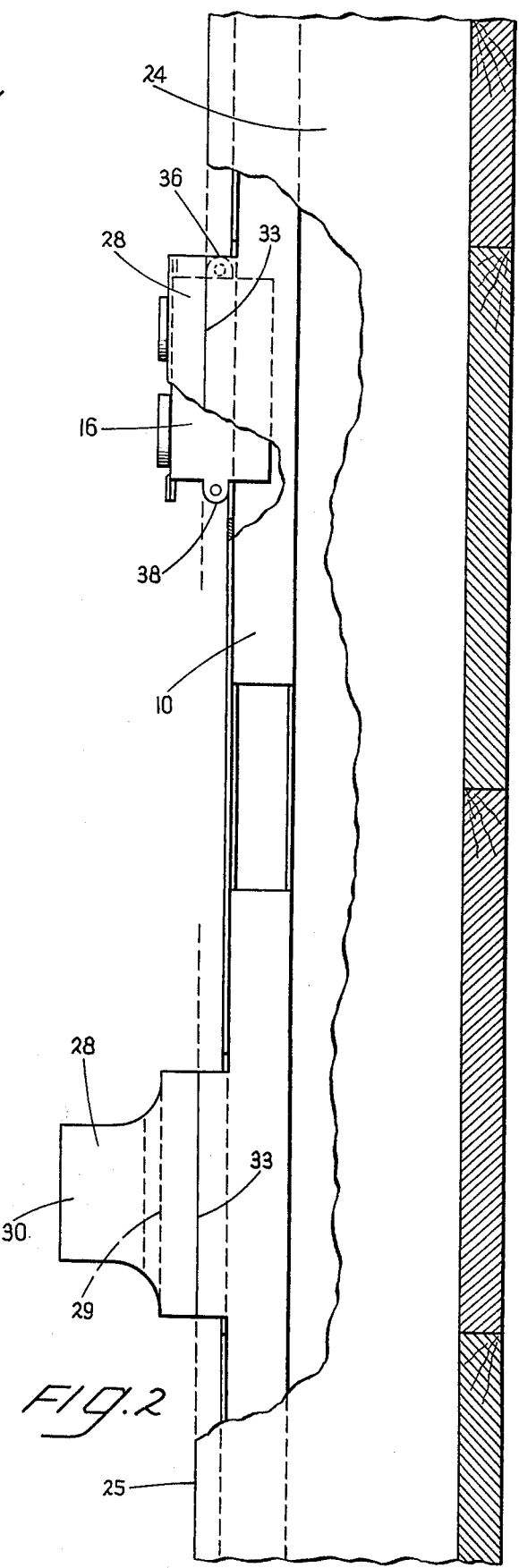

WIRING SYSTEM RETAINER

BACKGROUND AND SUMMARY OF THE INVENTION

The present invention relates in general to a retainer for a length of cable. This retainer is used in a power distribution system for containing the cable and permitting the fastening of a load device or electrical outlet associated with the cable to a stud, for example, of a building.

In my co-pending application Ser. No. 296,287, now U.S. Pat. No. 3,909,503, filed Oct. 10, 1972, there is disclosed a plastic bag retainer for holding a length of cable having an outlet connected to one end thereof. Although the arrangement shown is adequate there were some drawbacks associated therewith. For one thing, the bag disclosed in the co-pending application is quite bulky and cumbersome, is not readily attached to the framework of the building, and does not provide any means for positioning the electrical outlet.

Accordingly, one object of the present invention is to provide an improved retainer for a length of cable, which retainer is used in a power distribution system, and which cable has an electrical load device or outlet connected to one end thereof.

Another object of the present invention is to provide a retainer in accordance with the preceding object and that holds the load device at a predetermined position.

A further object of the present invention is to provide a retainer that also functions as a shipping carton for the length of cable.

Still another object of the present invention is to provide a relatively rigid retainer that will maintain the length of wire in a relatively fixed position within the retainer.

Another object of the present invention is to provide a retainer that is generally smaller than the one disclosed in my co-pending application and that need be attached to or associated with only one framework member.

To accomplish the foregoing and other objects there is provided a retainer for a length of cable and for use in a power distribution system of a building having a framework preferably including stud walls. The retainer is in the form of an elongated, rigid box having at least one cutout for receiving a load device or electrical outlet coupled to one end of the cable. The cable is preferably a multi-wire cable of the conventional type found in power distribution systems. The cutout for receiving the load device also defines a flap means for holding the device in place in the cutout and in a position to be secured to the framework. The load device is preferably constructed including means for receiving a nail and the box is constructed with a position marker for positioning the load device extending the proper distance from the framework. When the box is in the proper position the person installing the system then secures the load device by preferably hammering the nails associated therewith into the framework.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is an elevation view of the retainer of the present invention positioned intermediate the studs of a stud wall;

FIG. 2 is a cross-sectional view taken along line 2—2 of FIG. 1 with the stud partially cut away.

DETAILED DESCRIPTION

Figure 3:
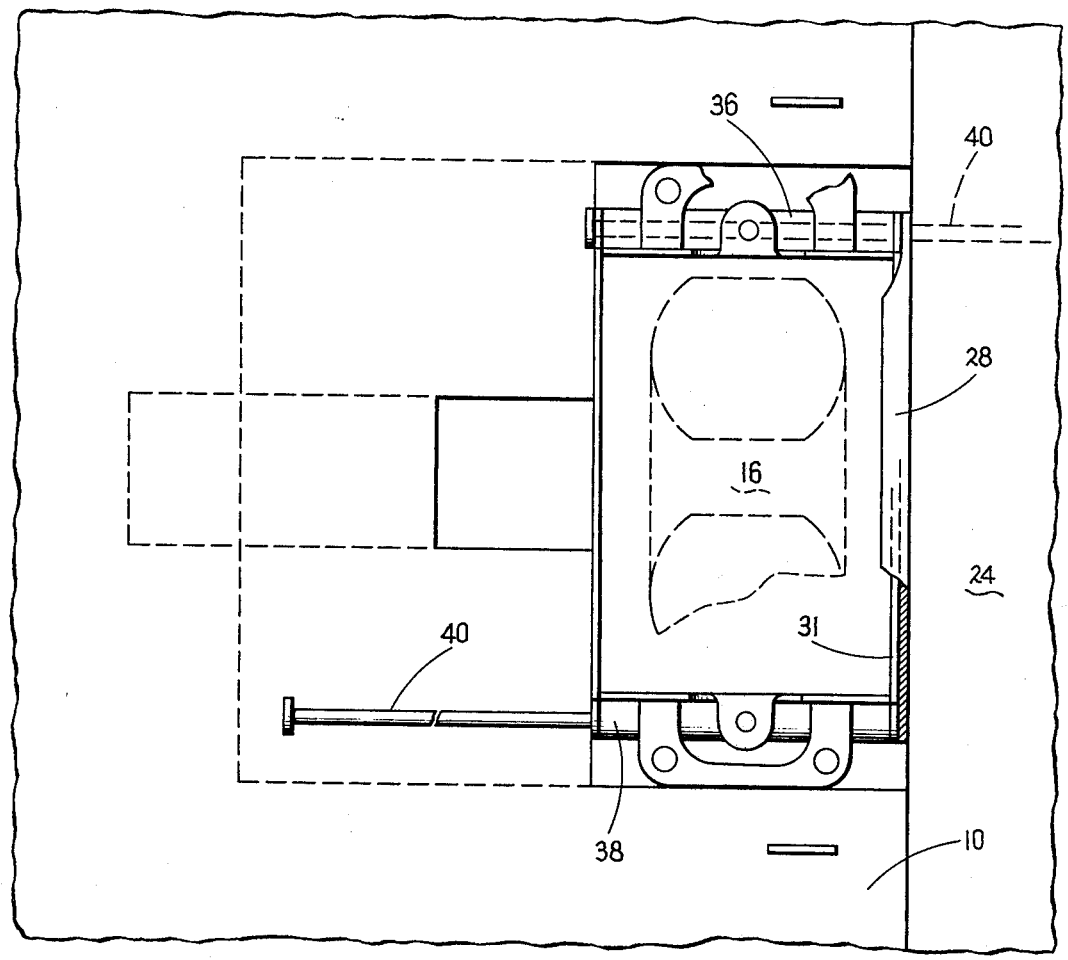
FIG. 3 is an enlarged view of a portion of the retainer shown in FIG. 1 including in particular the electrical outlet positioned therein.

In my co-pending application Ser. No. 296,287 there is shown a power distribution system including one or more distribution boxes and a number of retaining means each shown in that application as a plastic bag. FIG. 1 of the present application shows the retaining means in the form of a cardboard box 10 which has an elongated shape. The box has a cross-sectional area of approximately 8 inches by 1 inch, and may be originally fabricated in a single piece and folded into the box structure and stapled in that position.

The box 10 is open at its bottom and top ends and has four cutouts 12. The middle two cutouts also have a perforated area 14 disposed adjacent thereto. This perforated area can be removed when a large electrical outlet is to be held by the box.

In FIG. 1 a typical duplex electrical outlet 16 is shown in one of the cutouts 12. A cable 18 which is a multi-wire cable typically referred to as a Romex cable is coupled at one end to outlet 16 and is looped within box 10 having its other end 20 extending from the top end thereof. A holder 22 similar to the one shown in my co-pending application is used for retaining the end 20 in place at the top of the box 10.

FIG. 2 clearly shows the retaining box 10 and outlet 16. FIGS. 1 and 2 also show a stud 24 of a studwall to which the outlet 16 is to be attached. The outlet 16 is held in place by a flap 28 which may be formed from the cutout 12. In FIG. 2 the flap 28 is shown in its outlet securing position and also in its open position. Referring also now to FIG. 3 there is shown the outlet 16 and the flap 28 which is folded along perforated line 29 with the end 30 of the flap tucked into the outlet 16 around the sidewall 31 of the outlet.

The box and its associated outlet including the loop of cable may be shipped in a single unit. When the outlet is to be installed it is necessary to properly position the outlet relative to the outer face 25 of stud 24. Accordingly, the flap 28 is provided with a mark line 33 which is aligned by the person installing the outlet with the face 25 of the stud.

In the preferred mode of installation, the box 10 is not itself fastened to the stud 24. Rather, the conventional outlet 16 is provided with top and bottom channels 36 and 38, respectively which accommodate a nail 40 (see FIG. 3). In FIG. 3 one of the nails passing through the top holder 36 is shown after it has been hammered into the stud 24. The bottom nail 40 is shown in position for nailing. After the outlet has been secured in position the end 20 of the cable may then be connected in a known manner to one of the distribution boxes not shown in this application.

One of the features of the present invention is the particular placement of the cutouts 12 as depicted in FIG. 1. It is noted that this is a symmetrical arrangement and thus the box 10 can be inverted for attachment to the opposite side of the stud 24. The end 20 of the cable would then of course be positioned at the opposite end of the box. Also, in accordance with this invention other types of outlets can be retained by the box 10 other than the one illustrated herein. One of the advantages of the present invention is that by providing a relatively rigid box this maintains the loop of cable 18 in substantially a fixed position, functions as a shipping carton and also is useable as a jig for assisting in positioning the outlet. In accordance with this invention more than one outlet can also be associated with one of the retaining boxes 10. Another advantage of this arrangement is that, if the structure has already been insulated, this box 10 does not interfere with the insulation.

Having described one embodiment of the present invention, it should now be apparent that there are numerous other embodiments and modifications of the one disclosed herein, all of which are contemplated as falling within the spirit and scope of the present invention which is defined by the appended claims.

What is claimed is:

1. A retainer for use in a building constructed with a framework for holding a load device having a length of cable extending therefrom and terminating in a holder, said retainer comprising; an elongated cardboard-like box having opposite ends with the holder disposed at one of said ends and a plurality of cut out openings spacedly disposed along the box each defining a freely pivotal flap that pivots from a corner of the box and has a bend line extending in the same direction as the corner but spaced therefrom each said cut out opening for accommodating a load device having an edge wall for receiving an end of the flap with the bend in the flap limiting the insertion of the flap into the load device, said flap for holding the load device in place with the face of the load device extending outwardly from a wall forming the face of the box.

2. A retainer as set forth in claim 1 wherein said flap includes two sections demarcated by the bend line with said two sections being disposed on opposite sides and in contact with the edge wall.

3. A retainer as set forth in claim 2 including a marker line extending in the direction of the bend line along one of the sections of the flap that is disposed on the outside of the edge wall.

4. A retainer as set forth in claim 3 wherein the load device includes means at the top and bottom forming a channel for receiving a nail for securing the device to the framework.

5. A retainer as set forth in claim 3 wherein said bend line abuts against the outer end of the edge wall.

* * * * *